United States Patent [19]

Numata et al.

[11] Patent Number: 5,045,751

[45] Date of Patent: Sep. 3, 1991

[54] CATHODE RAY TUBE OF IMPROVED BREAKDOWN VOLTAGE CHARACTERISTIC

[75] Inventors: Takashi Numata, Chiba; Yusuke Kobayashi, Komae; Yoshihito Katayama, Tokyo; Junichi Iura, Yokohama; Toshiyasu Kawaguchi, Atsugi; Tsunehiko Sugawara, Chiba, all of Japan

[73] Assignee: Asahi Glass Company Ltd., Tokyo, Japan

[21] Appl. No.: 424,871

[22] Filed: Oct. 20, 1989

[30] Foreign Application Priority Data

Oct. 25, 1988 [JP] Japan .................. 63-267131
Nov. 4, 1988 [JP] Japan .................. 63-277306
Nov. 4, 1988 [JP] Japan .................. 63-277307
May 17, 1989 [JP] Japan .................. 1-121566

[51] Int. Cl.$^5$ ............................. H01J 31/00
[52] U.S. Cl. ...................... 313/479; 313/450; 313/477 R; 313/364; 313/313; 315/85; 358/245
[58] Field of Search ............ 313/479, 450, 477 R, 313/364, 313, 364, 450, 477 R, 479; 220/2.3 A; 315/85; 358/245, 246

[56] References Cited

U.S. PATENT DOCUMENTS

| 2,244,245 | 6/1941 | Ehrenberg ............... 313/479 |
| 4,018,717 | 4/1977 | Frankel et al. ........ 313/479 X |
| 4,217,521 | 8/1980 | Dietch et al. ............ 313/479 |
| 4,332,329 | 6/1982 | Scriven et al. ............ 358/245 |

FOREIGN PATENT DOCUMENTS 48-27716 12/1973 Japan .
53-73858 12/1978 Japan .

Primary Examiner—Donald J. Yusko
Assistant Examiner—John Giust
Attorney, Agent, or Firm—Oblon, Spivak, McClelland, Maier & Neustadt

[57] ABSTRACT

A cathode ray tube has an insulating layer formed at at least a part of the outer surface of a neck tube.

The insulating layer is a layer obtained by coating and baking a sol prepared by dispersing one or two or more metal alkoxides and metal salts in a hydrophilic oligomer state by adding water and an acid to a solution having one or two or more metal alkoxides and metal salts dissolved in an organic solvent such as an alcohol.

7 Claims, 4 Drawing Sheets

CATHODE RAY TUBE OF IMPROVED BREAKDOWN VOLTAGE CHARACTERISTIC

The present invention relates to a cathode ray tube. More particularly, it relates to a cathode ray tube having improved breakdown voltage characteristic.

Figure 6:
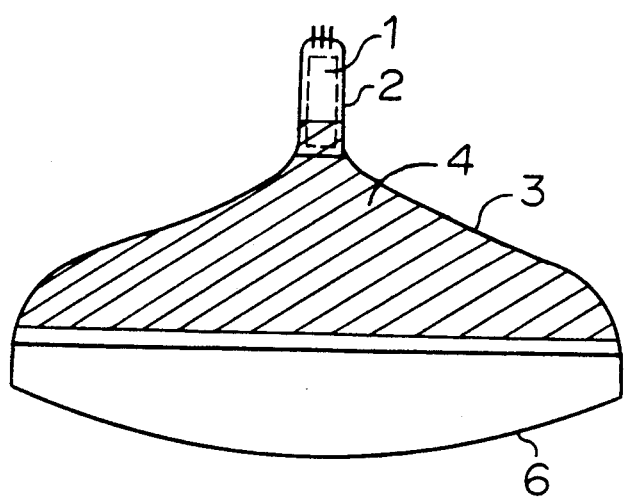
Figure 7:
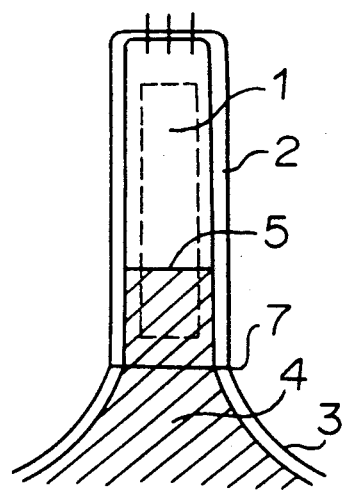

FIG. 6 is a diagram showing a conventional cathode ray tube in a form of model, and FIG. 7 is an enlarged side view of the neck portion of the cathode ray tube.

A conventional cathode ray tube for TVs has been prepared by melt-bonding or bonding with glass frit a panel 6, a funnel 3 and a neck tube 2 each being obtained by molding glass. The neck tube 2 houses an electron gun which emits electron beams by which a fluorescent layer coated on the inner surface of the panel 6 is excited for luminescence through a shadow mask. An inner conductive coating 4 (a so-called "aquadag") including graphite having good electric conductivity as the main component is coated on the inner surface of the funnel 3. The inner conductive coating 4 is also coated on the inner surface of the neck tube having a length of about 130 mm at a position of about 20–30 mm from the sealing portion 7 between the neck tube 2 and the funnel 3. In the conventional cathode ray tube, a voltage of about 30 KV is applied to the electron gun 1 in an ordinary state of actuation. At a switching time, a high voltage of about 60 KV is instantaneously applied to the electron gun 1. Therefore, there has sometimes taken place the problem of the breaking of the neck tube 2 at a portion near the end portion 5 of the inner conductive coating due to the application of a high voltage as shown in FIG. 7. In particular, a fault of breakdown voltage (an electric discharge, destruction of the neck tube and so on) was apt to occur at the end portion 5 of the inner conductive coating. Therefore, there has been a strong demand for a cathode ray tube having improved breakdown voltage characteristic. In order to improve the characteristic, there have been made such proposals that the formulation of glass for the neck tube 2 is changed in various ways, the thickness of the neck tube 2 is increased and so on. However, when the formulation of glass is changed, physical characteristics and other characteristics such as solubility and easiness of shaping glass are also changed, so that it is difficult to harmonize these characteristics. Further, an attempt to increase the thickness of the neck tube 2 results in restrictions to attach or detach a deflection yoke and to house the electron gun.

There have been known that a rough surface is formed on the surface of the neck portion or coarse glass powder is melt-bonded to the outer surface of the neck portion as described in Japanese Unexamined Utility Model Publications Nos. 27716/1973 and 73858/1978. However, they aimed at increasing the coercive force of the deflection yoke.

It is an object of the present invention to eliminate the above-mentioned problems and to provide a cathode ray tube in which an insulating layer is formed at least a part of the outer surface of a neck tube.

As the insulating layer of the present invention, a layer having a thickness of 10–1,000 $\mu$m which is obtained by coating glass frit followed by baking it at a temperature of about 440° C. is preferably used. A layer having a thickness of less than 10 $\mu$m is difficult to prepare and invites reduction in the breakdown voltage characteristic. On the other hand, when the thickness exceeds 1,000 $\mu$m, there is a problem with attaching or detaching the deflection yoke.

Secondly, a layer of silica is preferably used. The layer is formed by spraying a liquid having tetrachlorosilane and a silicon compound having an alkyl radical of the formula $Si(OC_2H_5)_4$ and so on dissolved in an alcohol solvent such as ethyl alcohol and by baking it at a temperature of about 400° C.

The thickness of the silica layer is preferably 0.1–300 $\mu$m. The silica layer having a thickness of less than 0.1 $\mu$m invites reduction in the breakdown voltage characteristic, on the other hand, the silica layer having a thickness of more than 300 $\mu$m causes difficulty of forming. Since the silica layer has function to reduce the concentration of electric charges even though it is thin in comparison with the glass frit, the silica layer is effective to improve the breakdown voltage characteristic. When the silica layer is to be formed, a large amount of silica particles ("Aerosil" of a nearly true sphere) having a diameter of 100 Å may be incorporated in order to form a thicker layer.

As another type of insulating layer, a layer capable of reinforcing glass may be used. Namely, the layer is obtained by coating and baking a sol prepared by dispersing one or two or more metal alkoxides and metallic salts in a hydrophilic oligomer state by adding water and an acid to a solution having one or two or more metal alkoxides and metal salts dissolved in an organic solvent such as an alcohol. Since the layer thus prepared is a continuous glassy layer which is chemically bonded to a glass surface, and is sufficiently dense without microcracks, it reduces the rate of expansion of a crack due to stress, it reduces the concentration of stress to an end of the crack, and prevents microcracks on the glass surface from growing. Accordingly, the layer preferably includes a metal oxide capable of chemically bonding an OH radical on the glass surface. As a precursor of the metal oxide, a combination of one or two or more metal alkoxides and metal salts such as nitrates, acetates, halides and so on may be used. Especially, silicon alkoxides such as ethyl silicate can be effectively used. Further, as metallic elements as the major component of the precursor, elements such as Ti, Zr, Al, Na and so on which are capable of producing a glass material can be used. In order to obtain a continuous layer which is sufficiently dense and has no microcrack, it is desirable that the sol in a coating liquid is a hydrophilic oligomer sufficiently hydrolyzed. Further, when the layer is to be formed on glass, it is important to form a continuous dense layer by a heat treatment at a low temperature (usually 300°–470° C.) lower than the strain point. When the layer is formed by heating at a temperature lower than 470° C., a sealing operation of the panel by using glass frit can be simultaneously conducted and it is unnecessary to use a step of annealing. Thus, in order to form the layer by baking at a low temperature, it is desirable that the degree of polycondensation of the ethyl silicate is still low and sol particles having a diameter of 10 Å–100 Å having a highly reactive surface are present in the coating liquid in a metastable state.

As a coating method for coating a treating liquid on glass, a dipping method, a spraying method or a brush-coating method or the like can be selected. Although the thickness of the layer is not particularly limited, a sufficient effect can be obtained as long as it has at least several thousands Å. When the thickness of the layer is to be increased, a wet-on-wet coating method may be used.

Further, in order to increase a reinforcing effect, the layer having a thickness of 10 μm or more may be formed by coating and baking a liquid prepared by dispersing fine metal oxide particles having an OH radical at the surface in the above-mentioned sol. As the fine metal oxide particles, a metal oxide having a high hardness such as Si, Al, Ti, Zn and so on is usually used. Since the main object of using the fine particles is to increase the thickness of the layer, it is sufficient to use fine metal oxide particles having high hardness and density. Although the diameter of the particles is not particularly limited, the diameter of 300–600 Å is usually used. Further, it is preferable that a large number of OH radicals are on the surface of the fine particles from the viewpoint of the wettable property and the chemical bonding property between the fine particles and the sol which functions as a binder.

In order to increase the thickness of the layer as much as possible, it is preferable to use a large amount of fine particles in comparison with the amount of the sol. When a layer having a thickness of more than two times compared to the layer formed by the sol without adding fine particles is prepared, the fine particles are added to the sol in an amount of more than 30% of the amount of the sol. When the fine particles are added in an amount of more than two times as the amount of the sol, the binding function decreases and a strong layer can not be obtained. By the addition of the fine metal particles, shrinkage in the volume of the layer resulted by the baking operation which controls the critical thickness of layer can be reduced. Further, formation of a thick layer is possible by only one coating operation because the concentration of a solid component and the viscosity are increased. In this case, the wettable property between the fine particles and the sol is a very important factor. If the wettable property is insufficient, pores will remain in the layer, and the layer having a sufficient hardness can not be obtained. Accordingly, it is desirable that the sol is a hydrophilic oligomer having the wettable property to the particles having an OH radical. Use of a surfactant can further improve the wettable property.

Further, the layer may be one obtained by coating and baking a liquid having fine metal oxide particles dispersed in a polysiloxane obtained by polymerizing a trifunctional alkoxide having an organic radical of the formula RSi (OR')$_3$ wherein R' is a methyl radical or an ethyl radical and R is a methyl radical, an ethyl radical or a phenyl radical), or in a polysiloxane obtained by copolymerizing said trifunctional alkoxide with a bifunctional alkoxide of the formula R$_2$Si (OR')$_2$ (wherein R' is a methyl radical or an ethyl radical and R is a methyl radical, an ethyl radical or a phenyl radical). The above-mentioned layer provides a flexible thick layer having a thickness of 5 μm–50 μm which could obtained by a conventional layer of an inorganic material by using an organic radical.

The trifunctional alkoxide or the bifunctional alkoxide having an organic radical reduces a stress of shrinkage at the time of curing as the reactive SiOH density decreases, and reduces stress caused by an increase of the mobility of a polymer chain in comparison with a tetrafunctional metal alkoxide such as methylsilicate. It is therefore possible to provide a layer having a thickness of 5 μm or more. Accordingly, commercially available trifunctional alkoxides such as alkyl radicals, phenyl radicals and glycidoxypropyl radicals as an organic radical are usable in order to form a thick layer.

An alkyl radical, especially, a methyl radical having excellent heat resistance characteristic (thermal decomposition characteristic) is most preferable.

In order to prepare a thick layer having good heat resistance characteristics, it is necessary to incorporate metal oxide particles in an amount of more than 20 weight % of the total solid component. Thus, the stress of shrinkage at the time of curing can be reduced, and temperature of decomposition of an organic radical can be improved, whereby it is possible to prepare in a stable manner the layer without causing peeling-off or occurrence of cracks within a temperature of 500° C. Further, the quality of dispersion of the fine particles in the coat liquid is important with respect to the ability of forming the layer after coating. When the quality of dispersion of the fine particles is insufficient, and the reaction between the trifunctional alkoxide having an organic radical and a hydrolyzed product is insufficient, there occur peeling-off and cracks in a drying step. Accordingly, an improvement of the quality of dispersion of the fine particles by adding the surfactant influences the ability of forming layer.

The above-mentioned insulating layer is preferably formed on the outer surface of the neck tube so as to have a length of 10–50 mm around the end portion 5 of an inner conductive coating as the center as shown in FIG. 7. Since the length of the neck tube is generally about 130 mm, it occupies an area of about 8–40% in the outer surface. The breakdown voltage characteristic of the insulating layer can be improved by applying the layer at a region of at least 5% of the outer surface area.

The insulating layer may be formed before or after the sealing of the neck tube to the funnel. However, it is more preferable to form the insulating layer before the sealing of the neck tube with the funnel because excellent workability can be obtained and the baking operation for the insulating layer can be conducted at the same time of annealing the neck tube.

Figure 1:
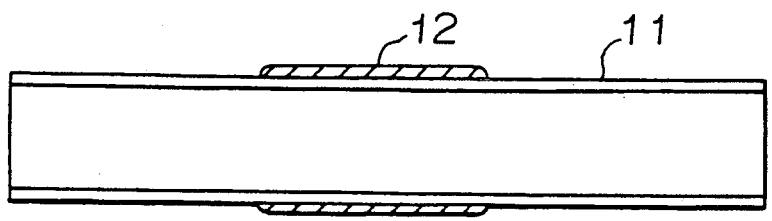
Figure 2:
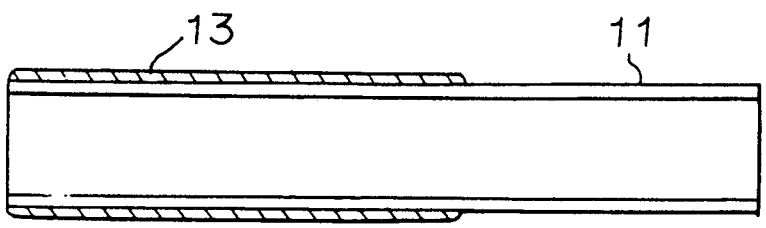
Figure 3:
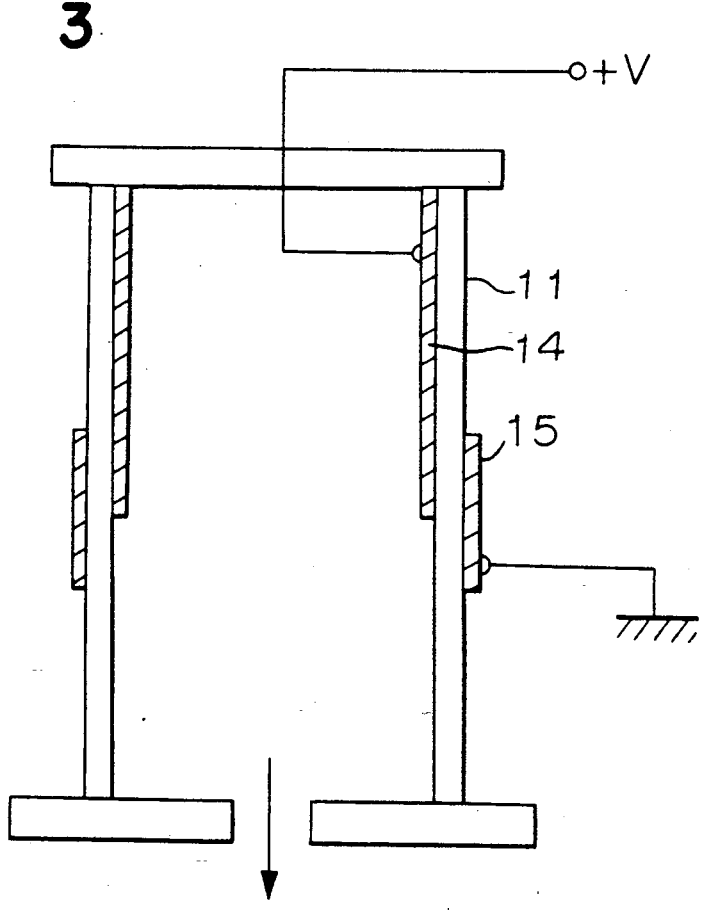
Figure 4:
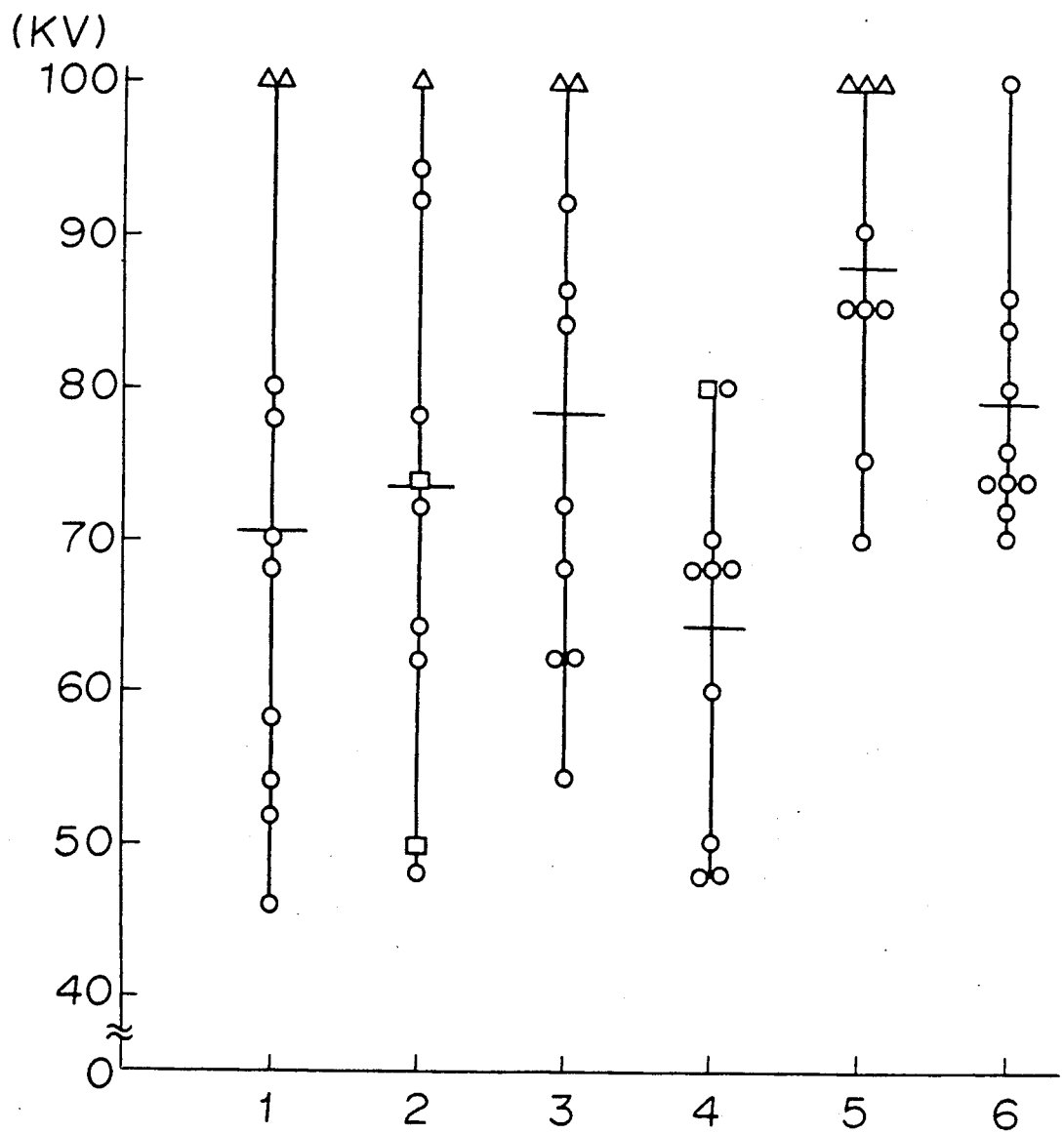
Figure 5:
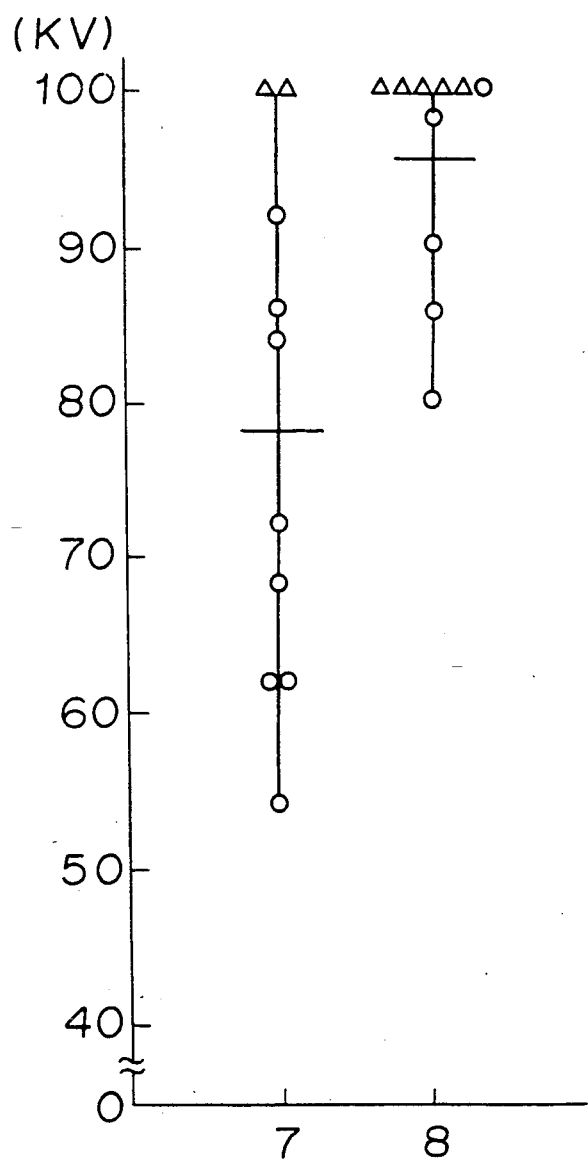

In the drawings:

FIGS. 1–5 show an embodiment of the cathode ray tube of the present invention wherein FIGS. 1 and 2 are respectively cross-sectional view of a neck tube in which an insulating layer of glass frit or silica is formed; FIG. 3 is a cross-sectional view showing a basic construction of a breakdown voltage testing device; FIGS. 4 and 5 are respectively graphs showing results of the measurement of the breakdown voltage; and FIGS. 6 and 7 show a conventional cathode ray tube wherein FIG. 6 is a side view showing a cathode ray tube in a form of model and FIG. 7 is a side view partly enlarged of a neck portion.

Preferred embodiments of the cathode ray tube of the present invention will be described with reference to the drawings.

In the present invention, an insulating layer formed on the outer surface of a neck tube provides more excellent effects than those obtained by merely increasing the thickness of the neck tube. Further, defects such as microcracks in the surface of the neck tube can be compensated by coating the insulating layer and the growth of the cracks can be prevented. Although the detailed mechanism and the function of the insulating layer of silica is not clear, it functions to disperse electric charges which tend to be concentrated at the end portion of an inner conductive coating because of the presence of an OH radical at the surface of the insulating layer, and it seems to reduce the steep gradient of an electric field produced between the end portion of the inner conductive coating and glass.

Several Examples will be described. However, the present invention is not limited to the Examples.

EXAMPLE 1

A layer of glass frit 12 was formed at the central portion of the outer surface of a neck tube 11 made of glass having the total length of 500 mm. The length of the layer 12 was 100 mm and the thickness was about 60 μm. FIG. 1 is a longitudinal cross-sectional view of the neck tube 11 with the glass frit layer 12. Both end portions of the glass frit layer 12 were at about 200 mm from both end portions of the neck tube 11. The glass frit layer 12 was formed by coating a paste-like material obtained by dissolving a CTV sealing frit ASF 1307W (Asahi Glass Company Ltd.) in a vehicle, followed by baking it at about 440° C. A voltage was applied to the neck tube 11 with use of an apparatus having the basic construction as shown in FIG. 3 and tests of breakdown voltage were conducted. As shown in FIG. 3, an inner conductive coating (graphite) 14 was coated on the inner surface of the neck tube in an area from its upper end portion to a position of 260 mm in the downward direction so that a d.c. voltage (+V) was applied thereto. A conductive layer 15 was coated on the outer surface of the neck tube in an area from its upper end portion to a position of 240 mm-340 mm in the downward direction, and the conductive layer 15 was electrically connected to the ground. The conductive layer 15 was same material as the inner conductive coating 14. Air in the neck tube 11 is evacuated to be a pressure of about $10^{-5}$ Torr so that it was kept at the same vacuum condition as an ordinary cathode ray tube.

Under various conditions (glass wall thickness, atmospheric temperature, voltage applied thereto, the presence or absence of the glass frit layer and the number of tested products), tests were respectively conducted on conventional products (No. 1-No. 5) and a product by the present invention (No. 6). The entire length of the conventional products (No. 1-No. 5) was 500 mm which was the same as that of the product of the present invention (No. 6).

TABLE 1

| No. | Glass wall thickness (mm) | Atmospheric temperature | Voltage applying method* | Glass frit | Number of tested products |
| --- | --- | --- | --- | --- | --- |
| 1 | 2.0 (Outer diameter 22.5) | Room temperature (about 30° C.) | A (Maintained time of 10 sec.) | None | 10 |
| 2 | 2.5 (Outer diameter 29.1) | Room temperature (about 30° C.) | A (Maintained time of 10 sec.) | None | 10 |
| 3 | 3.0 (Outer diameter 32.5) | Room temperature (about 30° C.) | A (Maintained time of 10 sec.) | None | 10 |
| 4 | 3.0 (Outer diameter 32.5) | 200° C. | A (Maintained time of 10 sec.) | None | 10 |
| 5 | 3.0 (Outer diameter 32.5) | Room temperature (about 30° C.) | B (Maintained time of 10 sec.) | None | 9 |
| 6 | 3.0 (Outer diameter 32.5) | Room temperature (about 30° C.) | A (Maintained time of 10 sec.) | Coated | 10 |

*Voltage-applying method
A: A voltage was increased to 20 KV in 3 seconds, and then the voltage was increased at every step of 2 KV at which 10 seconds were maintained. The maximum voltage was 100 KV.
B: A voltage was increased to 30 KV in 10 seconds, and then the voltage was increased at every step of 5 KV at which 10 minutes were maintained. The maximum voltage was 100 KV.

Results of the tests are shown in Table 2 and a graph in FIG. 4 respectively.

TABLE 2

| The value in brackets indicates an average value of depth of broken wall of breakdown test products | Breakdown voltage | | |
| --- | --- | --- | --- |
| | V*1 (KV) | MIN. (KV) | MAX.*2 (KV) |
| 1 (2.02) | 70.6 | 46.0 | 100.0 or higher |
| 2 (2.39) | 73.4 | 48.0 | 100.0 or higher |
| 3 (2.98) | 78.0 | 54.0 | 100.0 or higher |
| 4 | 64.0 | 48.0 | 80.0 or higher (electric discharge) |
| 5 | 87.8 | 70.0 | 100.0 or higher |
| 6 | 79.0 | 70.0 | 100.0 |

*1: V is an average value
*2: In a case of electric discharge, the maximum value when an electric discharge occured was obtained. In a case of 100 KV or higher, an average value was obtained under the condition that 100 KV was a breakdown voltage.

In comparing the test product (No. 6) of the present invention with a conventional product (No. 3) which was prepared under the same conditions as the test product (No. 6) except that there was no frit glass layer 12, the test product (No. 6) of the present invention showed an improvement of the breakdown voltage of only 1 KV in terms of the average value, while it showed an improvement of the breakdown voltage of 16 KV in terms of the minimum value.

In the test under the condition of an atmospheric temperature of 200° C., the test product (No. 4) showed a reduction of a breakdown voltage of 14 KV in terms of the average value and a reduction of 6 KV in terms of the minimum value. The flactuation of the breakdown voltage value was reduced by about 30 KV (however, there took place an electric discharge).

In the test product (No. 5) wherein 10 minutes are maintained for each voltage step, it showed an improvement of the breakdown voltage of 9.8 KV in terms of the average value and 16 KV in terms of the minimum value in comparison with the other test products having a maintaining time of 10 seconds. Generally, although it is considered that electric charges are concentrated at the end portion of the inner conductive coating applied on the inner surface of the neck tube where a breakdown occurs, a tendency of the concentration of electric charges decreases and an apparent breakdown voltage strength is improved by increasing a voltage-maintaining time. The fluctuation of the breakdown voltage of the test product (No. 5) was about 30 KV.

Although the test products No. 1–No. 3 showed a tendency that the breakdown voltage strength was improved as the glass wall thickness increases, it had an increasing rate in average value of 0.8 KV per glass wall thickness of 0.1 mm. The fluctuation of the breakdown voltage was about 50 KV for each of the test products. The test product (No. 6) of the present invention showed a remarkable improvement in the breakdown voltage characteristic in comparison with the conventional products except the test product No. 5 to which a different voltage-applying method was applied, and showed excellent effect in comparison with that obtained by increasing the glass wall thickness.

EXAMPLE 2

A silica layer 13 in a cylindrical form was formed on the outer surface of a neck tube 11 of glass having the entire length of 500 mm. The length of the silica layer 13 in the cylindrical form was 300 mm from end of the neck tube 11 and the thickness of it was about 0.1 µm. FIG. 2 is a longitudinal cross-sectional view of the neck tube 11. The silica layer 13 was obtained by spraying a solution having a tetrachlorosilane and a silicon compound having an alkyl radical of the formula $Si(OC_2H_5)_4$ dissolved in ethyl alcohol, by preliminarily baking it at 80°–120° C. and then baking it at about 400° C. Thus obtained neck tube 11 was placed in the test apparatus as shown in FIG. 3 and the breakdown voltage of the neck tube was measured by applying a voltage.

In the test device, the neck tube 11 (FIG. 2) was placed with the silica layer 13 directed upwardly. Results of measurement were shown in Table 3 and the graph of FIG. 5. The glass wall thickness was 3.0 mm (an outer diameter of 32.5 mm) in each of the test products. Tests were conducted under room temperature (about 30° C.). Voltage was so applied that it was increased to 20 KV in 3 seconds and 10 seconds were maintained at every step of 2 KV wherein the maximum voltage was 100 KV.

In Table 3, the test product No. 7 is one without having a silica layer, and the test product No. 8 is prepared according to the present invention.

TABLE 3

| Sample No./Glass wall thickness: 3 mm (outer diameter: 32.5 mm) | Breakdown voltage | | | Number of test products |
|---|---|---|---|---|
| | V (KV) | MIN. (KV) | MAX. (KV) | |
| 7 | 78.0 | 54.0 | 100.0 or higher | 10 |
| 8 | 95.4 | 80.0 | 100.0 or higher | 10 |

The test product No. 8 with the silica layer at its outer surface showed a remarkable improvement in the breakdown voltage strength i.e. 17 KV in terms of the average value and 26 KV in terms of the minimum value in comparison with the conventional product No. 7. The fluctuation of the breakdown voltage was small as 20 KV.

EXAMPLE 3

A layer was formed by using the liquid described below in the same manner as Example 2.

A sol containing fully hydrolyzed siloxane oligomer of a particle diameter of several 100 Å order was synthesized by mixing 8 mol times amount of ethanol and 11 mol times amount of acidic aqueous solution (pH=2–3) with ethyl silicate and refluxing the resultant mixture at about 90° C. for 3 hours. The sol was used as a coating liquid, and the neck tube with a mask on its inner surface was subjected to dip-coating at a raising rate of 10 cm/min. Then, the neck tube was dried at 60° C. for 5 minutes and was baked at 440° C. for 30 minutes. The thickness of the layer thus formed was about 3,000 Å.

The breakdown voltage of the neck tube was measured in the same manner as Example 2. A result of the measurement is shown as a sample No. 9 in Table 4. In comparison with a sample No. 7, the breakdown voltage strength was increased by 15 KV in terms of the average value and 24 KV in terms of the minimum value. The fluctuation of the breakdown voltage was small as about 22 KV.

EXAMPLE 4

An insulating layer was formed by the liquid described below in the same manner as in Example 2.

Ethyl silicate and an equivalent mol amount of Aerosil (a diameter of about 400 Å and the density of 2.2 g/cm$^3$) were added to siloxane oligomer sol fully hydrolyzed by mixing 8 mol times amount of ethanol and 11 mol times of acidic aqueous solution (pH=2–3) with ethyl silicate and refluxing at about 90° C. for 3 hours, and were fully agitated. The resultant suspension was treated by an ultrasonic homogenizer to prepare a uniform dispersion liquid. With use of the dispersion liquid, meniscus coating was conducted at the outer surface of the neck tube 11 at a coating speed of 20 cm/min. Then, the neck tube was dried at 60° C. for 5 minutes, and it was baked at 440° C. for 30 minutes. The thickness of the layer thus formed was about 10 µm.

Results of the measurement of the breakdown voltage conducted in the same manner as in Example 2 are shown as sample No. 10 in Table 4.

In comparison with the sample No. 7, it showed a remarkable improvement of the breakdown voltage strength as 16 KV in average and 28 KV in the minimum value. The fluctuation of the breakdown voltage was small as 18 KV.

EXAMPLE 5

An insulating layer was formed by using the liquid described below in the same manner as in Example 2. An acetic acid was added to water-dispersed colloidal silica having a particle diameter of 130–140 Å and a solid component of 40 weight % and the pH was adjusted to 4–6. The resultant mixture was dropwisely added to methyltrimethoxysilane or methyltriethoxysilane of the equimolar ratio to silica, and the mixture was agitated at the room temperature for more than 4 hours. A small amount of a surfactant was added and fully agitated to thereby prepare a coat liquid. With use of the coat liquid, meniscus coating was conducted at the outer surface of the neck tube 11 at a coating rate of 20 cm/min. The neck tube was dried at 100° C. for 15 minutes, and then was baked at 450° C. for 30 minutes.

The thickness of the layer thus formed was about 20 μm. The layer was a transparent layer without any scattering. Results of measurement of the breakdown voltage conducted in the same manner as in Example 2 is shown as sample No. 11 (an outer diameter of 29.1 mm) in Table 4.

In comparison with the sample No. 2 (an outer diameter of 29.1 mm), it showed a remarkable improvement of the breakdown voltage strength as 20 KV in the average value, and 32 KV in the minimum value.

TABLE 4

| Sample No./Glass wall thickness: 3 mm (No. 9, 10), 2.5 mm (No. 11) | Breakdown voltage | | | Number of test products |
|---|---|---|---|---|
| | V (KV) | MIN. (KV) | MAX. (KV) | |
| 9 (Outer diameter: 32.5 mm) | 93.2 | 78 | 100 or higher | 10 |
| 10 (Outer diameter: 32.5 mm) | 93.8 | 82 | 100 or higher | 10 |
| 11 (Outer diameter: 29.1 mm) | 93.2 | 80 | 100 or higher | 10 |

In accordance with the present invention, the breakdown voltage strength to the breakdown of the neck tube resulted by a high voltage applied to an electron gun housed in the neck tube can be remarkably improved. Accordingly, it is possible to actuate the electron gun at a high voltage in a stable manner.

We claim:

1. A cathode ray tube of improved breakdown voltage characteristic comprising an insulating layer formed in at least a part of the outer surface of its neck tube having the electron gun, and coinciding at least in part with the extent of said electron gun.

2. The cathode ray tube according to claim 1, wherein said insulating layer is a layer formed by baking glass frit.

3. The cathode ray tube according to claim 1, wherein said insulating layer is a silica layer.

4. The cathode ray tube according to claim 1, wherein said insulating layer is a layer obtained by coating and baking a sol prepared by dispersing one or two or more metal alkoxides and metal salts in a hydrophilic oligomer state by adding water and an acid to a solution having one or two or more metal alkoxides and metal salts dissolved in an organic solvent such as an alcohol.

5. The cathode ray tube according to claim 1, wherein said insulating layer is a layer obtained by coating and baking a liquid prepared by dispersing fine metal oxide particles having an OH radical at the surface in a sol containing one or two or more metal alkoxides and metal salts in a hydrophilic oligomer state by adding water and an acid to a solution having the metal alkoxides and one or two metal salts dissolved in an organic solvent such as an alcohol.

6. The cathode ray tube according to claim 1, wherein said insulating layer is a layer obtained by coating and baking a liquid having fine metal oxide particles dispersed in a polysiloxane obtained by polymerizing a trifunctional alkoxide having an organic radical of the formula $RSi(OR')_3$ (wherein R' is a methyl radical or an ethyl radical and R is a methyl radical, an ethyl radical or a phenyl radical) or in a polysiloxane obtained by copolymerizing said trifunctional alkoxide with a bifunctional alkoxide of the formula $R_2Si(OR')_2$ (wherein R' is a methyl or an ethyl and R is a methyl radical, an ethyl radical or a phenyl radical).

7. The cathode ray tube according to claim 1, wherein said insulating layer is formed at the outer surface of said neck tube to have a length in a range of 10–50 mm around an end of an inner conductive coating formed on the inner surface of said neck tube.

* * * * *